US012634984B2

(12) United States Patent 
Rosa et al.

(10) Patent No.: US 12,634,984 B2 
(45) Date of Patent: May 19, 2026

(54) INDICATING OR DETERMINING A CHANNEL ACCESS CONFIGURATION FOR AN UPLINK TRANSMISSION

(71) Applicant: Nokia Technologies Oy, Espoo (FI)

(72) Inventors: Claudio Rosa, Randers NV (DK); Timo Lunttila, Espoo (FI); Kari Hooli, Oulu (FI); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 468 days.

(21) Appl. No.: 18/040,576

(22) PCT Filed: Jun. 21, 2021

(86) PCT No.: PCT/FI2021/050470
§ 371 (c)(1),
(2) Date: Feb. 3, 2023

(87) PCT Pub. No.: WO2022/029366
PCT Pub. Date: Feb. 10, 2022

(65) Prior Publication Data
US 2023/0284265 A1 Sep. 7, 2023

Related U.S. Application Data

(60) Provisional application No. 63/062,242, filed on Aug. 6, 2020.

(51) Int. Cl.
*H04W 74/04* (2009.01)
*H04L 5/00* (2006.01)
(Continued)

(52) U.S. Cl.
CPC ........... *H04W 74/04* (2013.01); *H04L 5/0048* (2013.01); *H04W 74/02* (2013.01); *H04W 74/0808* (2013.01)

(58) Field of Classification Search
CPC ............. H04L 27/2602; H04L 27/2607; H04L 5/0023; H04L 5/0048; H04L 5/0082;
(Continued)

(56) References Cited

U.S. PATENT DOCUMENTS

| | | | |
|---|---|---|---|
| 11,665,739 B2 * | 5/2023 | Sun ...................... | H04W 74/002 370/329 |
| 2019/0335456 A1 * | 10/2019 | Yerramalli ........ | H04W 74/0808 |

(Continued)

OTHER PUBLICATIONS

Extended European Search Report received for corresponding European Patent Application No. 21853687.8, dated Aug. 6, 2024, 14 pages.

(Continued)

*Primary Examiner* — Kashif Siddiqui
(74) *Attorney, Agent, or Firm* — SQUIRE PATTON BOGGS (US) LLP

(57) ABSTRACT

Systems, methods, apparatuses, and computer program products for indicating network node fixed frame period (FFP) or UE FFP. A UE may transmit an uplink (UL) signal at a start of a UE FFP. A network node may respond by allocating UL resource(s) for subsequent UE transmission(s). The network node may implicitly signal, in Downlink Control Information (DCI), whether a UL transmission is to be transmitted based on assuming a UE FFP or a network node FFP for the UL transmission. The UE may make this assumption based on a cyclic prefix (CP) extension indication in DCI. For example, for certain CP extensions, the UE may determine to transmit the UL transmission according to the UE FFP. Otherwise, the UE may determine to transmit the UL transmission according to a network node FFP.

18 Claims, 5 Drawing Sheets

200

202 — Determine a network node fixed frame period configuration and a user equipment fixed frame period configuration for channel access 204 — Transmit a first uplink transmission using a configured uplink resource to initiate a first user equipment fixed frame period 206 — Receive downlink control information that schedules a second uplink transmission 208 — Determine whether the scheduled second uplink transmission is to be performed according to a network node fixed frame period or a second user equipment fixed frame period

(51) Int. Cl.
  *H04W 74/02* (2009.01)
  *H04W 74/0808* (2024.01)

(58) Field of Classification Search
  CPC .... H04L 5/0092; H04W 72/23; H04W 74/02;
    H04W 74/04; H04W 74/0808; Y02D
    30/70
  See application file for complete search history.

(56) References Cited

U.S. PATENT DOCUMENTS

2020/0037354 A1    1/2020  Li et al.
2023/0354428 A1*  11/2023  Xu ..................... H04W 74/0816

OTHER PUBLICATIONS

"Feature Lead's Summary #2 on Channel Access Procedures", 3GPP TSG RAN WG1 Meeting #99, R1-1913517, Agenda Item: 7.2.2.2.1, Nokia, Nov. 18-22, 2019, 28 pages.

"5 GHz RLAN; Harmonised Standard covering the essential requirements of article 3.2 of Directive 2014/53/EU", ETSI EN 301 893, V2.1.1, May 2017, pp. 1-122.

"3rd Generation Partnership Project; Technical Specification Group Radio Access Network; Physical layer procedures for shared spectrum channel access (Release 16)", 3GPP TS 37.213, V16.1.0, Mar. 2020, pp. 1-25.

"Revised WID: Enhanced Industrial Internet of Things (IoT) and ultra-reliable and low latency communication (URLLC) support for NR", 3GPP TSG RAN Meeting #88e, RP-201310, Agenda Item: 9.10.5, Nokia, Jun. 29-Jul. 3, 2020, 6 pages.

"Channel Access Procedures for NR-unlicensed", 3GPP TSG RAN WG1 Meeting #101-e, R1-2003728, Agenda Item: 7.2.2.2.1, Intel Corporation, May 25-Jun. 5, 2020, 13 pages.

"3rd Generation Partnership Project; Technical Specification Group Radio Access Network; NR; Multiplexing and channel coding (Release 16)", 3GPP TS 38.212, V16.1.0, Mar. 2020, pp. 1-146.

International Search Report and Written Opinion received for corresponding Patent Cooperation Treaty Application No. PCT/FI2021/050470, dated Oct. 25, 2021, 17 pages.

"Discussion on the channel access procedures", 3GPP TSG RAN WG1#99, R1- 1912012, Agenda Item: 7.2.2.2.1, vivo, Nov. 18-22, 2019, 10 pages.

"Summary of email discussion on URLLC/IIOT operation support in unlicensed spectrum", 3GPP TSG-RAN Meeting #88-e, RP-200802, Agenda Item: 9.10.5, Nokia, Jun. 29-Jul. 3, 2020, 18 pages.

"Channel access mechanism for NR-unlicensed", 3GPP TSG RAN WG1 Meeting #99, R1-1912197, Agenda Item: 7.2.2.2.1, Intel Corporation, Nov. 18-22, 2019, 30 pages.

* cited by examiner

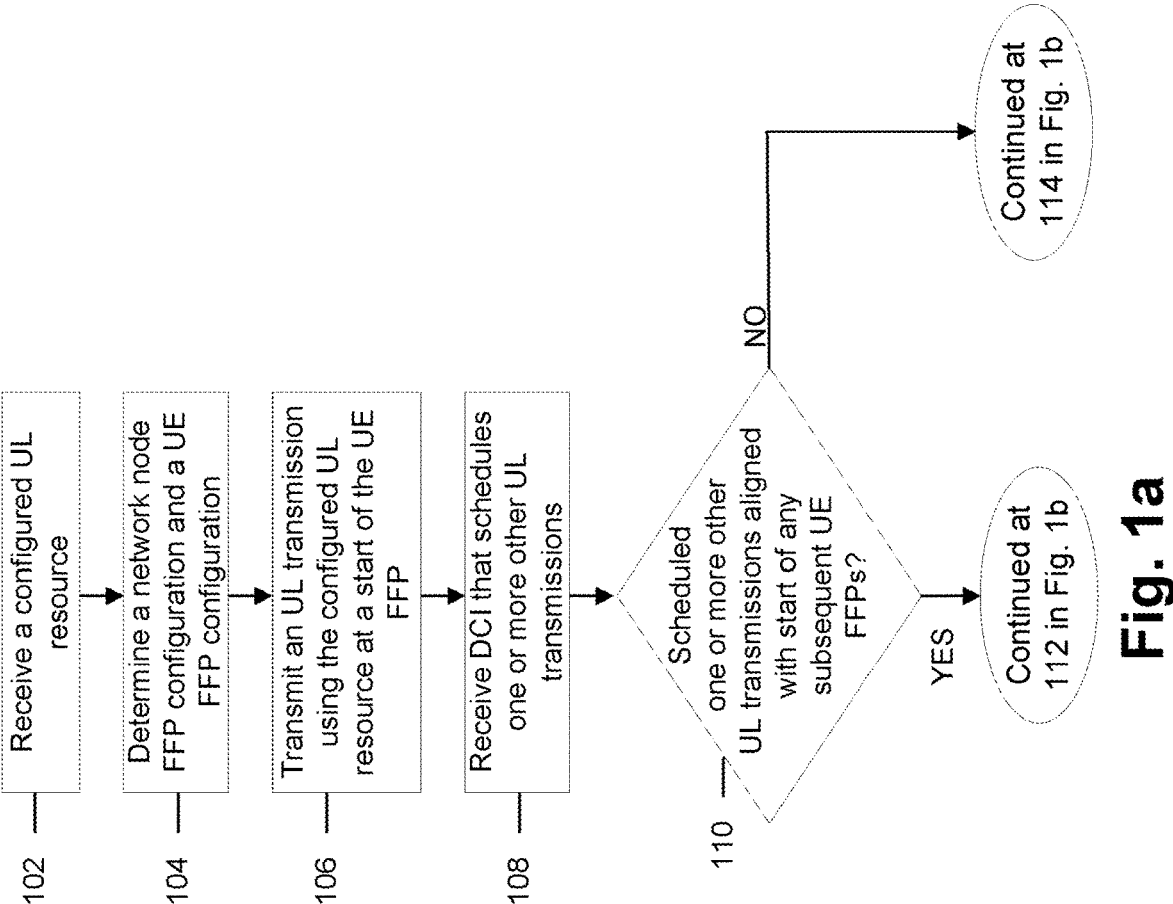

100

102 — Receive a configured UL resource

104 — Determine a network node FFP configuration and a UE FFP configuration

106 — Transmit an UL transmission using the configured UL resource at a start of the UE FFP 108 — Receive DCI that schedules one or more other UL transmissions 110 — Scheduled one or more other UL transmissions aligned with start of any subsequent UE FFPs?

NO — Continued at 114 in Fig. 1b

YES — Continued at 112 in Fig. 1b

Fig. 1a

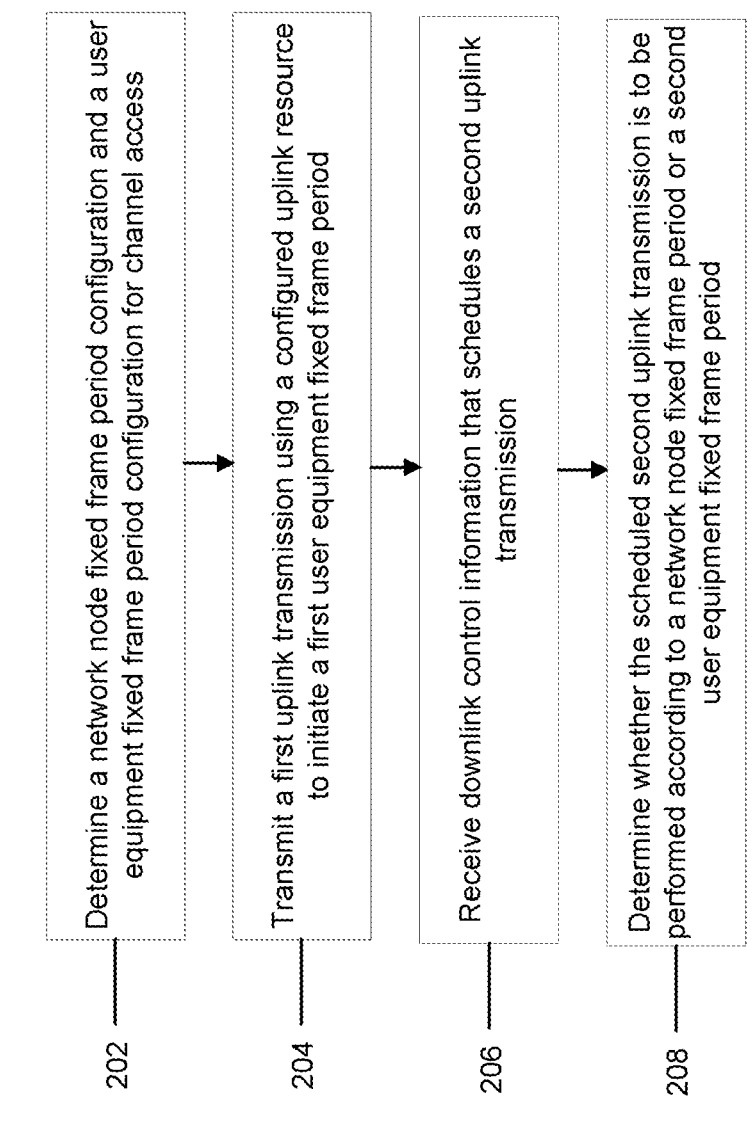

Determine a network node fixed frame period configuration and a user equipment fixed frame period configuration for channel access

202

Transmit a first uplink transmission using a configured uplink resource to initiate a first user equipment fixed frame period

204

Receive downlink control information that schedules a second uplink transmission

206

Determine whether the scheduled second uplink transmission is to be performed according to a network node fixed frame period or a second user equipment fixed frame period

302 — Receive a first uplink transmission using a configured uplink resource

304 — Transmit downlink control information that schedules a second uplink transmission

300

INDICATING OR DETERMINING A CHANNEL ACCESS CONFIGURATION FOR AN UPLINK TRANSMISSION

RELATED APPLICATION

This application was originally filed as PCT Application No. PCT/FI2021/050470 on Jun. 21, 2021, which claims priority from U.S. Provisional Application No. 63/062,242, filed on Aug. 6, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for indicating or determining a channel access configuration for an uplink transmission.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G is mostly built on a new radio (NR), but a 5G network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named next generation eNB (NG-eNB) when built on E-UTRA radio.

SUMMARY

According to a first embodiment, a method may include determining a network node fixed frame period configuration and a user equipment fixed frame period configuration for channel access. The method may include transmitting a first uplink transmission using a configured uplink resource to initiate a first user equipment fixed frame period. The method may include receiving downlink control information that schedules a second uplink transmission. The method may include determining whether the scheduled second uplink transmission is to be performed according to a network node fixed frame period or a second user equipment fixed frame period, based on one or more of: a position in time of the scheduled second uplink transmission with respect to the second user equipment fixed frame period, a cyclic prefix extension indicated in the downlink control information, or whether the downlink control information was received within the initiated first user equipment fixed frame period.

In a variant, determining whether the scheduled second uplink transmission is to be performed according to the network node fixed frame period or the second user equipment fixed frame period may further include determining that the scheduled second uplink transmission is to be performed according to the network node fixed frame period if one or more of the following conditions is met: the scheduled second uplink transmission is not aligned with the start of any subsequent user equipment fixed frame period following the first user equipment fixed frame period, or the cyclic prefix extension indicated in the downlink control information is a non-zero cyclic prefix extension. In a variant, determining whether the scheduled second uplink transmission is to be performed according to the network node fixed frame period or the second user equipment fixed frame period may further include, if the scheduled second uplink transmission is aligned with the start of any subsequent user equipment fixed frame period following the first user equipment fixed frame period, determining whether the scheduled second uplink transmission is to be performed according to the network node fixed frame period or the second user equipment fixed frame period based on the cyclic prefix extension.

In a variant, determining whether the scheduled second uplink transmission is to be performed according to the network node fixed frame period or the second user equipment fixed frame period may further include determining that the scheduled second uplink transmission is to be performed according to the second user equipment fixed frame period if the cyclic prefix extension is a zero cyclic prefix extension. In a variant, determining whether the scheduled second uplink transmission is to be performed according to the network node fixed frame period or the second user equipment fixed frame period may further include determining whether the scheduled second uplink transmission is to be performed according to the network node fixed frame period or the second user equipment fixed frame period based on at least one of the cyclic prefix extension indicated in the downlink control information or the position in time of the scheduled second uplink transmission, if the downlink control information was received within the initiated first user equipment fixed frame period.

In a variant, determining whether the scheduled second uplink transmission is to be performed according to the network node fixed frame period or the second user equipment fixed frame period may further include, if the scheduled second uplink transmission is within the first user equipment fixed frame period, determining whether the scheduled second uplink transmission is to be performed according to the network node fixed frame period or the first user equipment fixed frame period based on the cyclic prefix extension. In a variant, the method may further include determining a listen before talk type based on the determined network node fixed frame period or the second user equipment fixed frame period to be used for the scheduled second uplink transmission, and performing a listen before talk procedure based on the determined listen before talk type prior to transmitting the scheduled second uplink transmission.

In a variant, the method may further include, if the second UL transmission is to be performed according to the second user equipment fixed frame period and the listen before talk procedure has failed, performing one or more of: canceling one or more other uplink transmissions scheduled in addition to the second uplink transmission within the second user equipment fixed frame period, or determining to stop monitoring a channel until the start of a subsequent user equipment fixed frame period or a subsequent network node fixed frame period. In a variant, the method may further include determining at least one of a next channel monitoring occasion and a validity of additional uplink transmissions based on the determined network node fixed frame period or the second user equipment fixed frame period to be used for the scheduled second uplink transmission.

In a variant, the downlink control information may include a cyclic prefix extension indication. In a variant, a first value of the cyclic prefix extension may be defined to indicate that the network node fixed frame period is to be used. In a variant, a second value of the cyclic prefix extension may be defined to indicate that the second user equipment fixed frame period is to be used. In a variant, the second user equipment fixed frame period may be a same user equipment fixed frame period as the first user equipment fixed frame period or a user equipment fixed frame period following the first user equipment fixed frame period.

According to a second embodiment, a method may include receiving a first uplink transmission using a configured uplink resource. The first uplink transmission may initiate a first user equipment fixed frame period. The method may include transmitting downlink control information that schedules a second uplink transmission. The downlink control information may indicate whether a network node fixed frame period or a second user equipment fixed frame period is to be used for the scheduled second uplink transmission.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment or the second embodiment, or any of the variants discussed above.

A seventh embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein:

FIG. 1a illustrates certain aspects of an example of indicating network node fixed frame period (FFP) or user equipment (UE) FFP, according to some embodiments;

FIG. 2 illustrates an example flow diagram of a method, according to some embodiments;

DETAILED DESCRIPTION

Figure 1B:
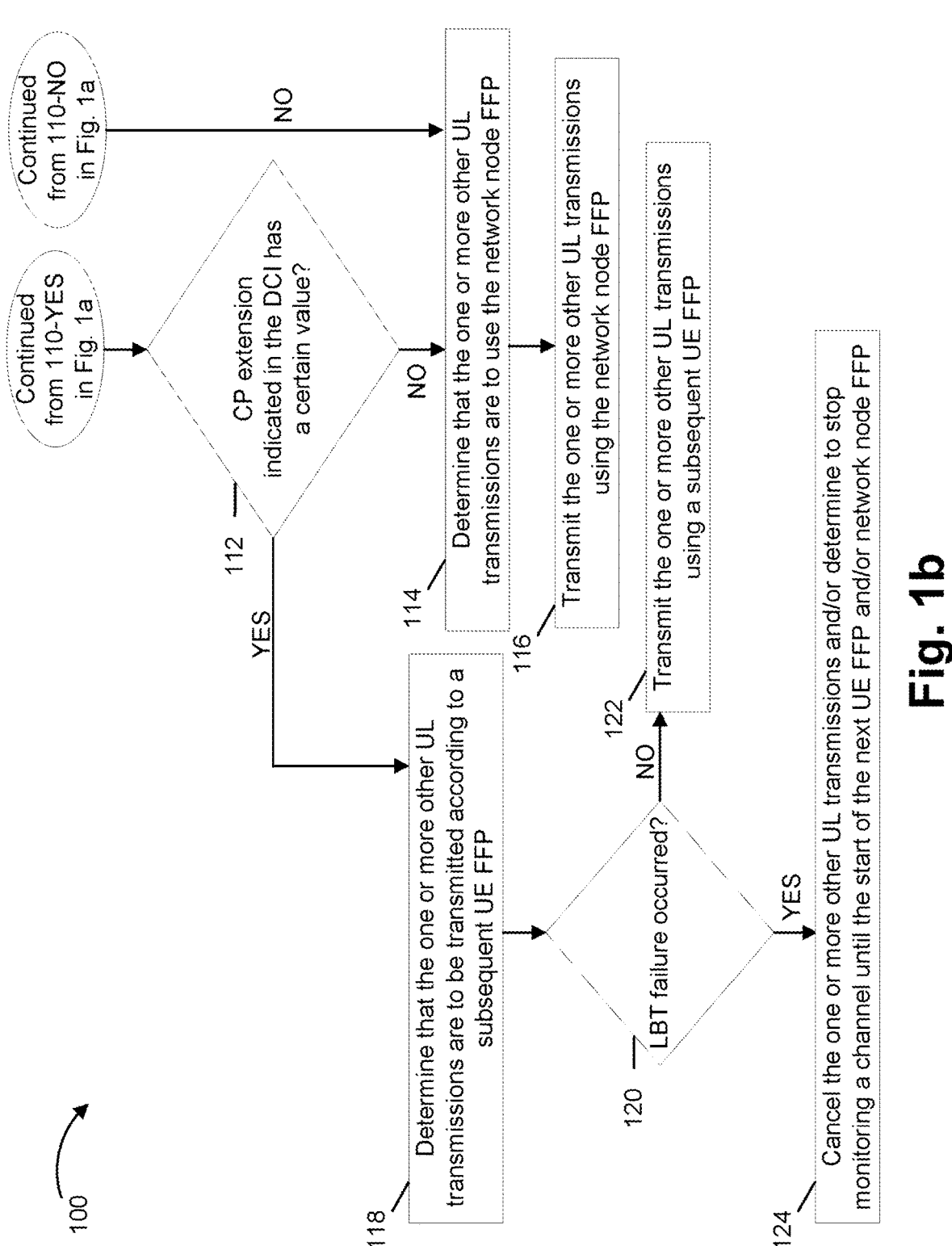
FIG. 1b illustrates certain other aspects of an example of indicating network node FFP or UE FFP.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for indicating or determining a channel access configuration for an uplink transmission is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

When operating in a shared frequency spectrum, e.g., a 5 gigahertz (GHz) unlicensed spectrum, one channel access mechanism may include use of frame-based equipment (FBE) channel access mode, which, in the 3rd Generation Partnership Project (3GPP), may also be referred to as semi-static channel occupancy. Channel access with FBE may be based on a fixed frame period (FFP). For example, the FFP may be within the range of 1 millisecond (ms) to 10 ms. The first transmission in an FFP may start at the beginning of an FFP. A device (e.g., a user equipment or a network node) may change its FFP but the device may not make this change more than once every 200 ms. Before starting transmissions on an operating channel at the start of an FFP, the initiating device may perform a clear channel assessment (CCA) check or a listen before talk (LBT) operation during a single observation slot (e.g., a 9 microsecond (μs) slot).

The operating channel may be considered occupied if an energy level in the channel exceeds an energy detection (ED) threshold level. If the initiating device determines that the operating channel(s) is clear, it may transmit on the operating channel(s). If the initiating device determines that an operating channel is occupied, then the initiating device may not transmit on that channel during the next FFP. A responding device that received a transmission grant from an associated initiating device may proceed with transmissions on the current operating channel(s) without performing a CCA. CCA may not be performed if transmission is initiated at most 16 μs after the last transmission by the initiating device or after performing a CCA on the operating channel during a single observation slot (e.g. a 9 μs observation slot) within a 25 μs period ending before the granted transmission time.

A UE may apply different LBT types depending on the channel access mode (e.g., load-based equipment (LBE) mode or FBE mode), and conditionally on whether a UE is operating as an initiating device or a responding device. With respect to LBE mode, if the UE is a responding device, the UE may apply a Type 2A/2B/2C LBT type, depending on a configuration of a network node and/or an indication from the network node. Otherwise, if the UE is an initiating device, then the UE may apply a Type 1 LBT type. With respect to FBE mode, if the UE is a responding device, the UE may apply a Type 2C LBT type or may perform a 9 μs CCA within a 25 μs period ending before the transmission, depending on a configuration of the network node and/or an indication from the network node. Otherwise, if the UE is an initiating device, the UE may perform a 9 μs CCA before the transmission.

For FBE mode, a UE-initiated channel occupancy time (COT) (e.g., when the UE is an initiating device) may be supported in some communication systems. When the UE can initiate the COT with FBE mode, in addition to the UE-initiated FFP, there may also be an overlapping network node FFP. For instance, the UE may have acquired an FFP for a UE-initiated uplink (UL) transmission (a first UL transmission) on a configured UL resource. The configured UL resource may include, e.g., a random access (RA) message 1 (Msg1), but may also include a configured grant-physical uplink shared channel (CG-PUSCH), a periodic physical uplink control channel (PUCCH), a scheduling request (SR), and/or the like. The network node may respond within the UE FFP and may schedule a UL transmission (a second UL transmission after the UE-initiated UL transmission) to the UE (e.g., RA message 2 (Msg2), or a CG-PUSCH retransmission), either within or outside of the UE FFP. FFPs of a particular UE (e.g., the FFPs where the particular UE may transmit its first and second UL transmission) may not be contained within a single network node FFP. For example, one UE FFP may overlap with two or more network node FFPs.

The UE may have information regarding whether the scheduled UL transmission is within the network node-acquired COT (e.g., by downlink control information (DCI) indication). The UE may use this information to determine the correct LBT type. In addition, the UE behavior after the (attempted) UL scheduled transmission may depend on whether the UE operates with UE FFP or network node FFP. For example, a UE may adjust physical downlink control channel (PDCCH) monitoring (e.g., for a RA message 4

(Msg4), or new scheduling of a RA message 3 (Msg3)) depending on if the UE operates with UE FFP or network node FFP. A UE may, e.g., stop monitoring for a MSG2 scheduling a MSG3 if LBT for UE fails at the beginning of UE FFP. In addition a validity of scheduled/configured UL transmissions following the attempted UL transmission at the beginning of UE FFP, in case the LBT procedure of the UE fails, may also depend on whether the UE operates with UE FFP or network node FFP. For example, if LBT procedure for UE FFP fails, the following scheduled/configured UL transmissions according to the UE FFP may be canceled. On the other hand, if the LBT procedure for network node FFP fails, the UE may attempt transmission of the following scheduled/configured UL transmissions.

If the UL transmission is scheduled outside of the current UE FFP with a starting position that is not aligned with the start of a UE FFP, the UE may assume that the network node may have acquired a COT, and may operate accordingly. However, if the UL transmission is scheduled within the UE-initiated COT and/or the starting position of the scheduled UL transmission is aligned with the start of a UE FFP, then an additional mechanism may be needed for the UE to determine whether to operate with UE FFP or network node FFP.

Since there is no LBT type specific for FBE operation, the LBT type signaled in the UL grant (e.g., Msg2, DCI format 0_0 or 0_1) may not be used to determine if the network node has acquired the COT. In addition, the UE may not know whether downlink (DL) transmission of a UL grant denotes network node-initiated FFP. Without a cyclic redundancy check (CRC)-protected indication from the network node, the UE may rely on reception of a DL signal (other than a UL grant) at the start of network node FFP.

Some embodiments described herein may provide for indicating or determining channel access configuration, e.g., whether a uplink transmission should be performed according to network node FFP or UE FFP, and LBT type for NR-U FBE operation with UE FFP. According to some embodiments, a UE may initiate a COT by transmitting a UL signal at a start of a UE FFP (e.g., RA Msg1). A network node may respond (e.g., with a RA Msg2) by allocating UL resource(s) for subsequent UE transmission(s). The network node may implicitly signal, in DCI, whether a UL transmission (e.g., a RA Msg3) is to be transmitted based on assuming a UE FFP or a network node FFP for the UL transmission. In some embodiments, the UE may make this assumption based on a cyclic prefix (CP) extension indication in DCI format 0_0. For example, if the indicated CP extension is a zero CP extension (or independent of a timing advance value used by the UE), the UE may determine to transmit the UL transmission according to the UE FFP (e.g., using the UE FFP or within the UE FFP). Otherwise, the UE may determine to transmit the UL transmission according to a network node FFP (e.g., using the network node FFP or within the network node FFP). Therefore, based on the implicit indication in the DCI, the UE may determine to transmit (or attempt to transmit) using a UE FFP or a network node FFP. The UE may further determine an LBT type to use in connection with the UL transmission, channel (e.g., PDCCH) monitoring occasions following the UL transmission, and/or a validity of one or more additional UL transmission occasions that may follow after the first transmission attempt. In this way, certain embodiments may provide for higher reliability with respect to FFP selection and use. For example, higher reliability compared to relying on additional detection of network node transmissions prior to the second scheduled UL transmission can be achieved with cyclic redundancy check (CRC)-protected (explicit or implicit) signaling within scheduling DCI. This may conserve computing resources and/or network resources of a UE, a network node, etc. that would otherwise be consumed through lower reliability selection of an FFP, e.g., based on detecting network node DL signals prior to the second scheduled transmission.

FIG. 1a illustrates certain aspects of an example of indicating network node FFP or UE FFP, according to some embodiments. In particular, FIG. 1a illustrates example operations 100 of a UE with respect to certain embodiments.

As illustrated at 102, the UE may receive a configured UL resource. For example, the configured UL resource may provide time-frequency resources for the UE to perform a UL transmission to a network node. The UE may receive the configured UL resource from the network node. As illustrated at 104, the UE may determine a network node FFP configuration and a UE FFP configuration. For example, the UE may determine the configurations based on receiving the configurations from the network node. An FFP configuration may include a configuration of an FFP duration (D) and a start offset (T). The start of an FFP may be at any time equal to T+N*D, where N is any number greater than or equal to zero (N=0, 1, 2, 3, etc.). Alternatively, for explicit configuration, some properties, such as start offset or duration, may be determined based on the UE initiating FFP for a first configured UL transmission. For example, a UE transmitting physical random access channel (PRACH) in a slot may denote an FFP start offset in that slot and the period may be determined based on a PRACH occasion periodicity configured by the network node.

As illustrated at 106, the UE may transmit a UL transmission (may be referred to as a first UL transmission) using the configured UL resource at a start of the UE FFP. The transmission at the start of the UE FFP may initiate the UE FFP and/or a COT associated with the UE FFP. The UL transmission may include, but is not limited to, a physical random access channel (PRACH) transmission, a PUCCH, a CG-PUSCH transmission, and/or the like. As illustrated at 108, the UE may receive DCI that schedules one or more other UL transmissions. Additionally, or alternatively, the DCI may indicate whether a network node FFP or a subsequent UE FFP is to be used for the one or more other UL transmissions. In certain embodiments, the DCI may be received during the UE FFP and/or the COT initiated by the previous UL transmission. Alternatively, the DCI may be received prior to the UE FFP and/or the COT that was used for the UL transmission at 106 except where the transmission of the DCI is triggered by the UL transmission at 106, or at another time during the UE operations described herein.

As illustrated at 110, the UE may determine whether the scheduled one or more other UL transmissions are aligned with the start of any of the subsequent UE FFPs. Additionally, or alternatively, the UE may determine whether the one or more other UL transmissions are scheduled for outside of the UE FFP that was used for the UL transmission at 106 (and whether the one or more other UL transmissions are aligned with the start of any of the subsequent UE FFPs). Additionally, or alternatively, the UE may determine whether the one or more other scheduled UL transmissions are scheduled within a UE FFP initiated by the UL transmission at 106. These determinations may be based on information indicated in the DCI. The description of the operations 100 of the UE are continued in FIG. 1b, which illustrates certain other aspects of the example of indicating network node FFP or UE FFP, according to some embodiments.

If the operations at 110 result in determining that the one or more scheduled other UL transmissions are not aligned with a start time of any of the subsequent UE FFPs (110—NO), then the UE may, at 114, determine that the one or more other UL transmissions are to use the network node FFP. Additionally, or alternatively, the UE may perform the operations illustrated at 114 if the UE determines that the one or more other UL transmissions are not scheduled to align with a start time of any of the subsequent UE FFPs and are scheduled for outside of the UE FFP initiated by the UL transmission at 106. Additionally, or alternatively, the UE may perform the operations illustrated at 112 (i.e., check the value of the CP extension) if the one or more other UL transmissions are not scheduled to align with a start time of any of the subsequent UE FFPs and are scheduled to be within a UE FFP initiated by the UL transmission at 106. For example, if a received DCI schedules one or more other UL transmissions within the first initiated UE FFP, the UE may transmit according to the first UE FFP or gNB FFP depending on what is signaled in DCI (e.g., the CP extension or an explicit FFP type indication). In connection with the operations illustrated at 114, the UE may determine an LBT type for the one or more other UL transmissions prior to transmitting the one or more other UL transmissions. As illustrated at 116, the UE may transmit the one or more other UL transmissions using the network node FFP.

If the operations at 110 result in the UE determining that the one or more other UL transmissions are aligned with the start of any of the subsequent UE FFPs (e.g., subsequent UE FFPs within a time period, such as 200 ms) (110—YES), then the UE may determine, at 112, whether the CP extension indicated in the DCI has a certain value. For example, the UE may determine whether the CP extension is a zero CP extension. If the CP extension does not have the certain value (112—NO), then the UE may perform operations 114 and 116 described above. Alternatively, or additionally, the UE may determine at 112 whether the DCI was received during a UE FFP initiated by the UE. For example, the UE may determine this based on a slot index of the slot in which the DCI scheduling second UL transmission(s) was received. For example, the determination may be based on whether the DCI was received in a slot with an even or an odd slot index. Alternatively, the determination may be based on whether the DCI was received within or outside a preconfigured slot sub-set of a network node FFP.

If the CP extension has the certain value (112—YES), and/or, if the DCI is received within the UE FFP initiated by the UE, the UE may determine, at 118, that the one or more other UL transmissions are to be transmitted according to a subsequent UE FFP. Although operations 110-112 have described various determination operations for determining whether the one or more other UL transmissions are to use UE FFP or network node FFP, the network node may, in certain embodiments, explicitly signal to the UE whether the one or more other UL transmissions are to use either UE FFP or network node FFP. For example, the network node may explicitly indicate, e.g., using a FFP type indicator, that the one or more other UL transmissions are to use UE FFP or network node FFP if the network node is using random access response (RAR) DCI, or another type of DCI that includes available reserved or unused bits that can be used for the indication.

In addition, the UE may determine an LBT type for an LBT procedure to be performed prior to transmitting the one or more other UL transmissions. As illustrated at 120, the UE may perform the LBT procedure and may determine whether an LBT failure has occurred. If an LBT failure does not occur (120—NO), then the UE may transmit, at 122, the one or more other UL transmissions on a channel using a subsequent UE FFP based on determining that that channel is clear (or idle or vacant) from the successful LBT procedure. After transmitting the one or more other UL transmissions, the UE may determine one or more next monitoring occasion(s) for a channel (e.g., a PDCCH) and an availability of one or more additional UL transmissions. The UE may perform operations starting at 102 when one or more additional UL transmissions are available.

If an LBT failure occurs (120—YES), then the UE may, at 124, cancel the one or more other UL transmissions and/or determine to stop monitoring a channel (e.g., PDCCH) until the start of the next UE FFP and/or network node FFP, whichever occurs first. For example, the UE may drop subsequent scheduled and/or configured UL transmissions within the scheduled UE FFP. Once the UE resumes monitoring, the UE may return to operation 102 described above.

In some embodiments, the determination made at block 112 may be omitted. That is, if UE determines at 110 that the one or more other scheduled UL transmissions are aligned with the start of any of the subsequent UE FFPs (110—YES), then the UE may perform block 118 directly, e.g., may assume that the one or more scheduled UL transmissions are to be performed according to the UE FFP.

With respect to determination of LBT type and assumptions regarding using UE FFP and/or network node FFP described above, certain UE operations may be based on signaling of channel access type-related and CP extension-related fields in the DCI (e.g., DCI format 0_0). For example, in the case of semi-static channel occupancy with UE-initiated FFP, the UE may operate as described in Tables 1 and 2 below. One difference between the example implementations in Tables 1 and 2 is in the interpretation of index 2 in "Channel Access Type" and "CP extension" fields in the DCI.

TABLE 1

| Index | Channel Access Type | CP Extension | UE Operation |
|---|---|---|---|
| 0 | Type2C-ULChannelAccess | C2*symbol length-16 us-TA | Within gNB COT, Type 2C |
| 1 | Type2A-ULChannelAccess | C3*symbol length-25 us-TA | Within gNB COT, 9 us CCA within a 25 us period ending before the transmission |
| 2 | Type2A-ULChannelAccess | C1*symbol length-25 us | Within gNB COT, 9 us CCA within a 25 us period ending before the transmission |
| 3 | Type1-ULChannelAccess | 0 | UE FFP (start new UE COT, or within UE COT), 9 us CCA immediately before the transmission |

TABLE 2

| Index | Channel Access Type | CP Extension | UE Operation |
|---|---|---|---|
| 0 | Type2C-ULChannelAccess | C2*symbol length-16 us-TA | Within gNB COT, Type 2C |
| 1 | Type2A-ULChannelAccess | C3*symbol length-25 us-TA | Within gNB COT, 9 us CCA within a 25 us period ending before the transmission |
| 2 | Type2C-ULChannelAccess | C1*symbol length-25 us | Within UE COT, Type 2C |
| 3 | Type1-ULChannelAccess | 0 | Start new UE COT (or within UE COT), 9 us CCA before the transmission |

In Tables 1 and 2, C1, C2, and C3 may be constant values and TA may represent a timing advance. From Table 1 above, for index 2, the UE may assume use of a network node (e.g., gNB) COT and may apply a 9 μs CCA within a 25 μs period ending before the transmission. This may allow TA-independent CP extension within a network node FFP. From Table 2, for index 2, the UE may assume UE COT and may apply a Type 2C LBT type. This may allow Type 2C LBT according to a UE FFP. According to both Table 1 and Table 2, the UE may assume a UE COT, if a zero CP extension is indicated.

As described above, FIGS. 1*a* and 1*b* are provided as examples. Other examples are possible, according to some embodiments.

FIG. 2 illustrates an example flow diagram of a method 200, according to some embodiments. For example, FIG. 2 shows example operations of a UE (e.g., apparatus 20 illustrated in, and described with respect to, FIG. 4*a*). Some of the operations illustrated in FIG. 2 may be similar to some operations shown in, and described with respect to, FIGS. 1*a* and 1*b*.

In an embodiment, the method may include, at 202, determining a network node fixed frame period configuration and a user equipment fixed frame period configuration for channel access, for example, in a manner similar to that described at 104 of FIG. 1*a*. In some embodiments, UE may determine the network node fixed frame period configuration and/or the user equipment fixed frame period configuration by receiving a configuration from a network node. The method may include, at 204, transmitting a first uplink transmission using a configured uplink resource to initiate a first user equipment fixed frame period, for example, in a manner similar to that described at 106 of FIG. 1*a*. The method may include, at 206, receiving downlink control information that schedules a second uplink transmission, for example, in a manner similar to that described at 108 of FIG. 1*a*.

The method may include, at 208, determining whether the scheduled second uplink transmission is to be performed according to a network node fixed frame period or a second user equipment fixed frame period, for example, in a manner similar to that described at 110 of FIG. 1*a* (e.g., the second user equipment fixed frame period may be the initiated first user equipment fixed frame period or a subsequent user equipment fixed frame period). For instance, the determining may be based on a position in time of the scheduled second uplink transmission with respect to the second user equipment fixed frame period, for example, in a manner similar to that at 110 of FIG. 1*a*. Additionally, or alternatively, the determining may be based on a cyclic prefix extension indicated in the downlink control information, for example, in a manner similar to that at 112 of FIG. 1*b*. Additionally, or alternatively, the determining may be based on whether the downlink control information was received within the initiated first user equipment fixed frame period at 106.

The UE may perform one or more other operations in connection with the method illustrated in FIG. 2. The determining of 208 may include determining that the scheduled second uplink transmission is to be performed according to the network node fixed frame period if one or more of the following conditions is met: the scheduled second uplink transmission is not aligned with the start of any subsequent user equipment fixed frame period following the first user equipment fixed frame period, or the cyclic prefix extension indicated in the downlink control information is a non-zero cyclic prefix extension (e.g., in a manner similar to that described at 112—NO of FIG. 1*b*).

The determining of 208 may include determining whether the scheduled second uplink transmission is to be performed according to the network node fixed frame period or the second user equipment fixed frame period based on the cyclic prefix extension if the scheduled second uplink transmission is aligned with the start of any subsequent user equipment fixed frame period following the first user equipment fixed frame period, for example, in a manner similar to that at 112 of FIG. 1*b*. The determining of 208 may include determining that the scheduled second uplink transmission is to be performed according to the second user equipment fixed frame period if the cyclic prefix extension is a zero cyclic prefix extension, for example, in a manner similar to that at 112—YES of FIG. 1*b*. In some embodiments, the UE may determine at 208 whether the scheduled second uplink transmission is to be performed according to the network node fixed frame period or the second user equipment fixed frame period based on at least one of the cyclic prefix extension indicated in the downlink control information and the position in time of the scheduled second uplink transmission, if the downlink control information was received within the initiated first user equipment fixed frame period.

The method may further include determining a listen before talk type based on the determined fixed frame period type (i.e., a network node fixed frame period or a UE fixed frame period) to be used for the scheduled second uplink transmission, and performing a listen before talk procedure based on the determined listen before talk type prior to transmitting the scheduled second uplink transmission, for example, in a manner similar to that described at 122 of FIG. 1*b*. In some embodiments, the UE may perform a listen before talk procedure independently of whether the UE is to use network node fixed frame period or UE fixed frame period, but the listen before talk type may differ depending on the determined fixed frame period to be used. Prior to transmitting the scheduled second UL transmission using a subsequent UE fixed frame period or a network node fixed frame period, the UE may perform the listen before talk procedure based on corresponding listen before talk type. Based on the failure determination, the UE may, if the second uplink transmission is to be performed according to a subsequent fixed frame period and the user equipment listen before talk procedure has failed, cancel one or more other uplink transmissions scheduled in addition to the second uplink transmission within the second user equipment fixed frame period. Additionally, or alternatively, the UE may determine to stop monitoring a channel until the start of another subsequent user equipment fixed frame period or a subsequent network node fixed frame period (e.g., a UE fixed frame period or a network node fixed frame period subsequent to the UE fixed frame period with a start that was aligned with the second UL transmission). The canceling and stopping operations may be performed, for example, in a manner similar to that described at 124. The method may further include determining at least one of a next channel monitoring occasion and a validity of additional uplink transmissions based on the determined fixed frame period type to be used for the scheduled second UL transmission.

In some embodiments, the downlink control information may include a fixed frame period type indication for indicating whether the network node fixed frame period or the second user equipment fixed frame period is to be used for the scheduled second uplink transmission. This provides an explicit way for indicating the fixed frame period type to be used. In some embodiments, the downlink control information may include a cyclic prefix extension indication. A first value of the cyclic prefix extension may be defined to indicate that the network node fixed frame period is to be used. The second value of the cyclic prefix extension may be defined to indicate that the second user equipment fixed frame period is to be used. This enables to indicate the fixed frame period type to be used implicitly without increasing signaling overhead.

As described above, FIG. 2 is provided as an example. Other examples are possible according to some embodiments.

Figure 3:
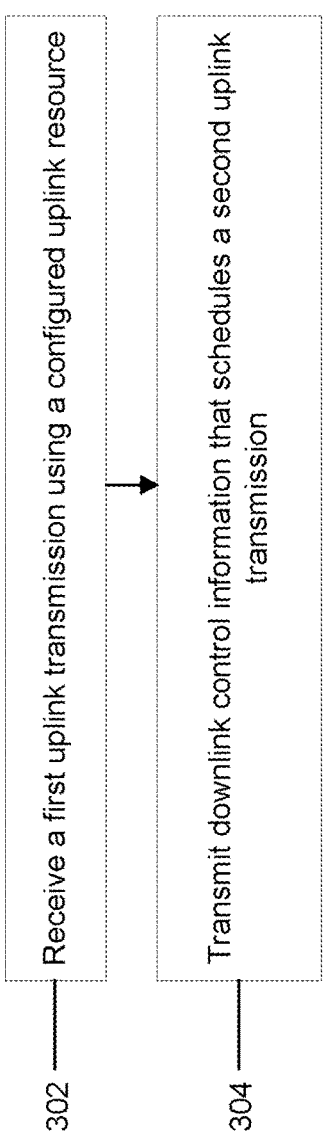
FIG. 3 illustrates an example flow diagram of a method, according to some embodiments.

FIG. 3 illustrates an example flow diagram of a method 300, according to some embodiments. For example, FIG. 3 shows example operations of a network node (e.g., apparatus 10 illustrated in, and described with respect to, FIG. 4*b*). Some of the operations illustrated in FIG. 3 may be similar to some operations shown in, and described with respect to, FIG. 1.

In an embodiment, the method may include, at 302, receiving a first uplink transmission (e.g., a random access Msg1) using a configured uplink resource, for example, in connection with the operations described at 106 of FIG. 1*a*. The uplink transmission may initiate a first user equipment fixed frame period. The method may further include, at 304, transmitting downlink control information (e.g., a RAR message) that schedules a second uplink transmission (e.g., a random access Msg3), for example, in connection with the operations described 108 of FIG. 1*a*. The downlink control information may indicate whether a network node fixed frame period or a second user equipment fixed frame period is to be used for the scheduled second uplink transmission. In some embodiments, the first uplink transmission may include PUCCH or PUSCH transmission. In some embodiments, the downlink control information may indicate the fixed frame period type to be used explicitly or implicitly, as described above.

As described above, FIG. 3 is provided as an example. Other examples are possible according to some embodiments.

Figures 4A, 4B:
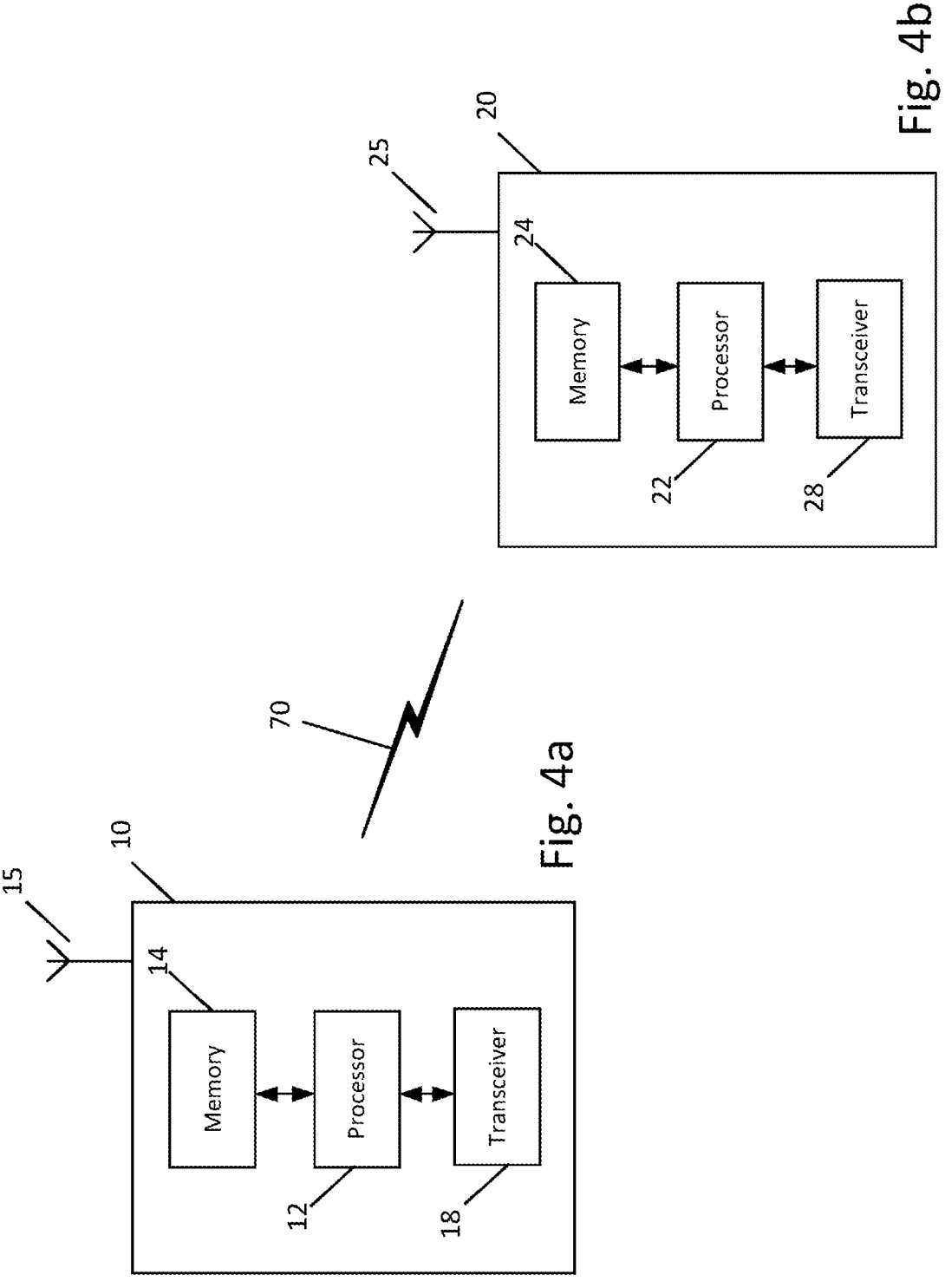
FIG. 4a illustrates an example block diagram of an apparatus, according to an embodiment.
FIG. 4b illustrates an example block diagram of an apparatus, according to another embodiment.

FIG. 4*a* illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a Wireless Local Area Network (WLAN) access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, Universal Serial Bus (USB) drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of Global System for Mobile Communications (GSM), narrow band (NB)-IoT, LTE, 5G, WLAN, Bluetooth (BT), BT-low energy (LE), near-field communication (NFC), radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or radio access network (RAN) node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1 and 3. For instance, apparatus 10 may be controlled by memory 14 and processor 12 to perform the method of FIG. 3.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as Orthogonal Frequency-Division Multiple Access (OFDMA) symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated, or described with respect to, in FIGS. 1-2. For instance, in one embodiment, apparatus 20 may be controlled by memory 24 and processor 22 to perform the method of FIG. 2.

In some embodiments, an apparatus (e.g., apparatus 10 and/or apparatus 20) may include means for performing a method or any of the variants discussed herein, e.g., a method described with reference to FIG. 2 or 3. Examples of the means may include one or more processors, memory, and/or computer program codes for causing the performance of the operation.

Therefore, certain example embodiments provide several technological improvements, enhancements, and/or advantages over existing technological processes. For example, one benefit of some example embodiments is provide for higher reliability with respect to FFP selection and use. Accordingly, the use of some example embodiments results in improved functioning of communications networks and their nodes and, therefore constitute an improvement at least to the technological field of selection and use of FFP, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

CCA Clear Channel Assessment
CG Configured Grant
COT Channel Occupancy Time
CP Cyclic Prefix
CRC Cyclic Redundancy Check
DCI Downlink Control Information
DL Downlink
FBE Frame Based Equipment
FFP Fixed Frame Period
gNB Next Generation Node-B
IIOT Industrial Internet of Things
LBE Load Based Equipment
LBT Listen-Before-Talk
NR-U NR Unlicensed
PDCCH Physical Downlink Control Channel
PRACH Physical Random Access Channel PUCCH Physical Uplink Control Channel
PUSCH Physical Uplink Shared Channel
RA Random Access
RAR Random Access Response
UCI Uplink Control Information
UE User Equipment
UL Uplink
URLLC Ultra Reliable Low Latency Communication
The invention claimed is:

1. A method, comprising:

performing, by a user equipment, a first determination of a network node fixed frame period configuration and a user equipment fixed frame period configuration for channel access;

transmitting, by the user equipment, a first uplink transmission using a configured uplink resource to initiate a first user equipment fixed frame period;

receiving, by the user equipment, downlink control information that schedules a second uplink transmission; and performing, by the user equipment, a second determination of whether the scheduled second uplink transmission is aligned with a start of any subsequent user equipment fixed frame period following the first user equipment fixed frame period based on a position in time of the scheduled second uplink transmission with respect to a second user equipment fixed frame period, wherein when the scheduled second uplink transmission is not aligned with a start of any subsequent user equipment fixed frame period following the first user equipment fixed frame period, the second determination comprises determining that the scheduled second uplink transmission is performed according to a network node fixed frame period, and wherein when the scheduled second uplink transmission is aligned with the start of any subsequent user equipment fixed frame period following the first user equipment fixed frame period, the second determination comprises determining whether the scheduled second uplink transmission is performed according to the network node fixed frame period or the second user equipment fixed frame period.

2. The method according to claim 1, wherein when the scheduled second uplink transmission is aligned with the start of any subsequent user equipment fixed frame period following the first user equipment fixed frame period, the second determination is based on a cyclic prefix extension indicated in the downlink control information.

3. The method according to claim 1, wherein determining whether the scheduled second uplink transmission is to be performed according to the network node fixed frame period or the second user equipment fixed frame period further comprises:

determining that the scheduled second uplink transmission is to be performed according to the second user equipment fixed frame period if a cyclic prefix extension indicated in the downlink control information is a zero cyclic prefix extension.

4. The method according to claim 1, wherein determining whether the scheduled second uplink transmission is to be performed according to the network node fixed frame period or the second user equipment fixed frame period further comprises:

determining whether the scheduled second uplink transmission is to be performed according to the network node fixed frame period or the second user equipment fixed frame period based on at least one of a cyclic prefix extension indicated in the downlink control information or the position in time of the scheduled second uplink transmission, if the downlink control information was received within the initiated first user equipment fixed frame period.

5. The method according to claim 1, wherein determining whether the scheduled second uplink transmission is to be performed according to the network node fixed frame period or the second user equipment fixed frame period further comprises:

if the scheduled second uplink transmission is within the first user equipment fixed frame period, determining whether the scheduled second uplink transmission is to be performed according to the network node fixed frame period or the first user equipment fixed frame period based on a cyclic prefix extension indicated in the downlink control information.

6. The method according to claim 1, further comprising:

determining, by the user equipment, a listen before talk type based on the determined network node fixed frame period or the second user equipment fixed frame period to be used for the scheduled second uplink transmission; and performing, by the user equipment, a listen before talk procedure based on the determined listen before talk type prior to transmitting the scheduled second uplink transmission.

7. The method according to claim 1, wherein the downlink control information comprises a cyclic prefix extension indication, wherein a first value of the cyclic prefix extension is defined to indicate that the network node fixed frame period is to be used, and wherein a second value of the cyclic prefix extension is defined to indicate that the second user equipment fixed frame period is to be used.

8. An apparatus, comprising:

at least one processor; and at least one memory including computer program code, wherein the at least one memory and the computer program code are configured to, with the at least one processor, cause the apparatus at least to:

perform a first determination of a network node fixed frame period configuration and a user equipment fixed frame period configuration for channel access;

transmit a first uplink transmission using a configured uplink resource to initiate a first user equipment fixed frame period;

receive downlink control information that schedules a second uplink transmission; and perform a second determination of whether the scheduled second uplink transmission is aligned with a start of any subsequent user equipment fixed frame period following the first user equipment fixed frame period based on a position in time of the scheduled second uplink transmission with respect to a second user equipment fixed frame period, wherein when the scheduled second uplink transmission is not aligned with a start of any subsequent user equipment fixed frame period following the first user equipment fixed frame period, the second determination comprises determining that the scheduled second uplink transmission is performed according to a network node fixed frame period, and wherein when the scheduled second uplink transmission is aligned with the start of any subsequent user equipment fixed frame period following the first user equipment fixed frame period, the second determination comprises determining whether the scheduled second uplink transmission is performed according to the network node fixed frame period or the second user equipment fixed frame period.

9. The apparatus according to claim 8, wherein when the scheduled second uplink transmission is aligned with the start of any subsequent user equipment fixed frame period following the first user equipment fixed frame period, the second determination is based on a cyclic prefix extension indicated in the downlink control information.

10. The apparatus according to claim 8, wherein the at least one memory and the computer program code are further configured to, with the at least one processor, cause the apparatus at least to:

determine that the scheduled second uplink transmission is to be performed according to the second user equipment fixed frame period, if a cyclic prefix extension indicated in the downlink control information is a zero cyclic prefix extension.

11. The apparatus according to claim 8, wherein the at least one memory and the computer program code are further configured to, with the at least one processor, cause the apparatus at least to:

determine whether the scheduled second uplink transmission is to be performed according to the network node fixed frame period or the second user equipment fixed frame period based on at least one of a cyclic prefix extension indicated in the downlink control information or the position in time of the scheduled second uplink transmission, if the downlink control information was received within the initiated first user equipment fixed frame period.

12. The apparatus according to claim 8, wherein the at least one memory and the computer program code are further configured to, with the at least one processor, cause the apparatus at least to:

determine whether the scheduled second uplink transmission is to be performed according to the network node fixed frame period or the first user equipment fixed frame period based on a cyclic prefix extension indicated in the downlink control information, if the scheduled second uplink transmission is within the first user equipment fixed frame period.

13. The apparatus according to claim 8, wherein the at least one memory and the computer program code are configured to, with the at least one processor, further cause the apparatus at least to:

determine a listen before talk type based on the determined network node fixed frame period or the second user equipment fixed frame period to be used for the scheduled second uplink transmission; and perform a listen before talk procedure based on the determined listen before talk type prior to transmitting the scheduled second uplink transmission.

14. The apparatus according to claim 13, wherein the at least one memory and the computer program code are configured to, with the at least one processor, further cause the apparatus at least to:

if the second uplink transmission is to be performed according to the second user equipment fixed frame period and the listen before talk procedure has failed, perform one or more of:

canceling one or more other uplink transmissions scheduled in addition to the second uplink transmission within the second user equipment fixed frame period, or determining to stop monitoring a channel until the start of a subsequent user equipment fixed frame period or a subsequent network node fixed frame period.

15. The apparatus according to claim 8, wherein the at least one memory and the computer program code are configured to, with the at least one processor, further cause the apparatus at least to:

determine at least one of a next channel monitoring occasion or a validity of additional uplink transmissions, based on the determined network node fixed frame period or the second user equipment fixed frame period to be used for the scheduled second uplink transmission.

16. The apparatus according to claim 8, wherein the downlink control information comprises a cyclic prefix extension indication, wherein a first value of the cyclic prefix extension is defined to indicate that the network node fixed frame period is to be used, and wherein a second value of the cyclic prefix extension is defined to indicate that the second user equipment fixed frame period is to be used.

17. The apparatus according to claim 8, wherein the second user equipment fixed frame period is a same user equipment fixed frame period as the first user equipment fixed frame period or a user equipment fixed frame period following the first user equipment fixed frame period.

18. An apparatus, comprising:

at least one processor; and at least one memory including computer program code, wherein the at least one memory and the computer program code are configured to, with the at least one processor, cause the apparatus at least to:

receive a first uplink transmission using a configured uplink resource, wherein the first uplink transmission initiates a first user equipment fixed frame period; and transmit downlink control information that schedules a second uplink transmission, wherein when the scheduled second uplink transmission is not aligned with a start of any subsequent user equipment fixed frame period following the first user equipment fixed frame period, the downlink control information indicates that a network node fixed frame period is to be used for the scheduled second uplink transmission, and wherein when the scheduled second uplink transmission is aligned with the start of any subsequent user equipment fixed frame period following the first user equipment fixed frame period, the downlink control information indicates whether the network node fixed frame period or a second user equipment fixed frame period is to be used for the scheduled second uplink transmission.

* * * * *